(12) United States Patent
Dodge et al.

(10) Patent No.: US 9,120,172 B2
(45) Date of Patent: Sep. 1, 2015

(54) SYSTEMS AND METHODS PROVIDING CONTROLLED AC ARC WELDING PROCESSES

(71) Applicants: Robert L. Dodge, Mentor, OH (US); George B. Koprivnak, Painesville, OH (US); Steven R. Peters, Huntsburg, OH (US)

(72) Inventors: Robert L. Dodge, Mentor, OH (US); George B. Koprivnak, Painesville, OH (US); Steven R. Peters, Huntsburg, OH (US)

(73) Assignee: Lincoln Global, Inc., City of Industry, CA (US)

( * ) Notice: Subject to any disclaimer, the term of this patent is extended or adjusted under 35 U.S.C. 154(b) by 199 days.

(21) Appl. No.: 13/625,188

(22) Filed: Sep. 24, 2012

(65) Prior Publication Data

US 2014/0083987 A1    Mar. 27, 2014

(51) Int. Cl.
*B23K 9/095* (2006.01)
*B23K 9/10* (2006.01)
*B23K 9/09* (2006.01)
*B23K 9/16* (2006.01)

(52) U.S. Cl.
CPC ............... *B23K 9/1043* (2013.01); *B23K 9/09* (2013.01); *B23K 9/095* (2013.01); *B23K 9/1075* (2013.01); *B23K 9/16* (2013.01)

(58) Field of Classification Search
CPC .......... B23K 9/09; B23K 9/091; B23K 9/092; B23K 9/10; B23K 9/1006; B23K 9/1025
USPC ............... 219/130.1, 130.21, 130.33, 130.51, 219/130.32, 137 PS
See application file for complete search history.

(56) References Cited

U.S. PATENT DOCUMENTS

| | | | |
|---|---|---|---|
| 1,993,852 A | 3/1935 | Miller |
| 3,657,724 A | 4/1972 | Feeley et al. |
| 4,322,602 A | 3/1982 | Grist |
| 4,371,776 A | 2/1983 | Winn |
| 4,544,826 A | 10/1985 | Nakanishi et al. |
| 4,972,064 A | 11/1990 | Stava |
| 5,338,916 A | 8/1994 | Blankenship et al. |

(Continued)

FOREIGN PATENT DOCUMENTS

| | | |
|---|---|---|
| CA | 2139715 | 8/1995 |
| DE | 19828869 | 12/1999 |

(Continued)

OTHER PUBLICATIONS

Dynasty 200 SD and DX TIG Welders; MillerWelds; 2 pgs.; http://www.millerwelds.com/products/tig.

(Continued)

*Primary Examiner* — Brian Jennison
(74) *Attorney, Agent, or Firm* — Hahn, Loeser & Parks, LLP

(57) ABSTRACT

Systems and methods for providing controlled AC arc welding processes. In arc welding power source embodiments, configurations of main and auxiliary bridge circuits allow for the directional switching of the output welding current through the welding output circuit path and selectively provide one or more high impedance paths to rapidly decay the arc current. The high impedance path aids in the low spatter transfer of molten metal balls from a consumable electrode to a workpiece and further aids in the maintaining or the re-establishing of an arc between the consumable electrode and the workpiece when a molten metal ball is transferred.

17 Claims, 14 Drawing Sheets

(56) References Cited

U.S. PATENT DOCUMENTS

| | | | |
|---|---|---|---|
| 5,343,017 A | 8/1994 | Karino et al. | |
| 5,710,696 A | 1/1998 | Reynolds et al. | |
| 5,958,261 A | 9/1999 | Offer et al. | |
| 6,034,350 A | 3/2000 | Heraly et al. | |
| 6,051,810 A * | 4/2000 | Stava | 219/137 PS |
| 6,215,100 B1 | 4/2001 | Stava | |
| 6,384,373 B1 | 5/2002 | Schwartz | |
| 6,833,529 B2 | 12/2004 | Ueyama et al. | |
| 7,385,159 B2 | 6/2008 | Stava | |
| 7,919,728 B2 | 4/2011 | Era et al. | |
| 8,067,714 B2 | 11/2011 | Era et al. | |
| 8,299,398 B2 | 10/2012 | Madsen | |
| 2004/0074884 A1 | 4/2004 | Butler | |
| 2007/0051712 A1* | 3/2007 | Kooken et al. | 219/130.1 |
| 2008/0264915 A1 | 10/2008 | Manthe et al. | |
| 2012/0118865 A1 | 5/2012 | Stava et al. | |
| 2013/0162136 A1 | 6/2013 | Baldwin et al. | |

FOREIGN PATENT DOCUMENTS

| | | |
|---|---|---|
| DE | 20114660 | 2/2002 |
| DE | 10245368 | 4/2004 |
| EP | 0538227 | 4/1993 |
| GB | 1069512 | 5/1967 |
| GB | 2081156 | 2/1982 |
| JP | 63171267 | 7/1988 |
| JP | 2002096167 | 4/2002 |
| JP | 2002096167 A | 4/2002 |
| WO | 9839138 | 9/1998 |

OTHER PUBLICATIONS

PCT/IB2013/002113—International Preliminary Report on Patentability and Written Opinion of the International Searching Authority—mailed Apr. 2, 2015.

PCT/IB2013/00252—International Preliminary Report on Patentability—May 19, 2015.

\* cited by examiner

NEGATIVE BACKGROUND, PINCH, PEAK, AND TAILOUT

NEGATIVE CURRENT DECAY, LOW CURRENT

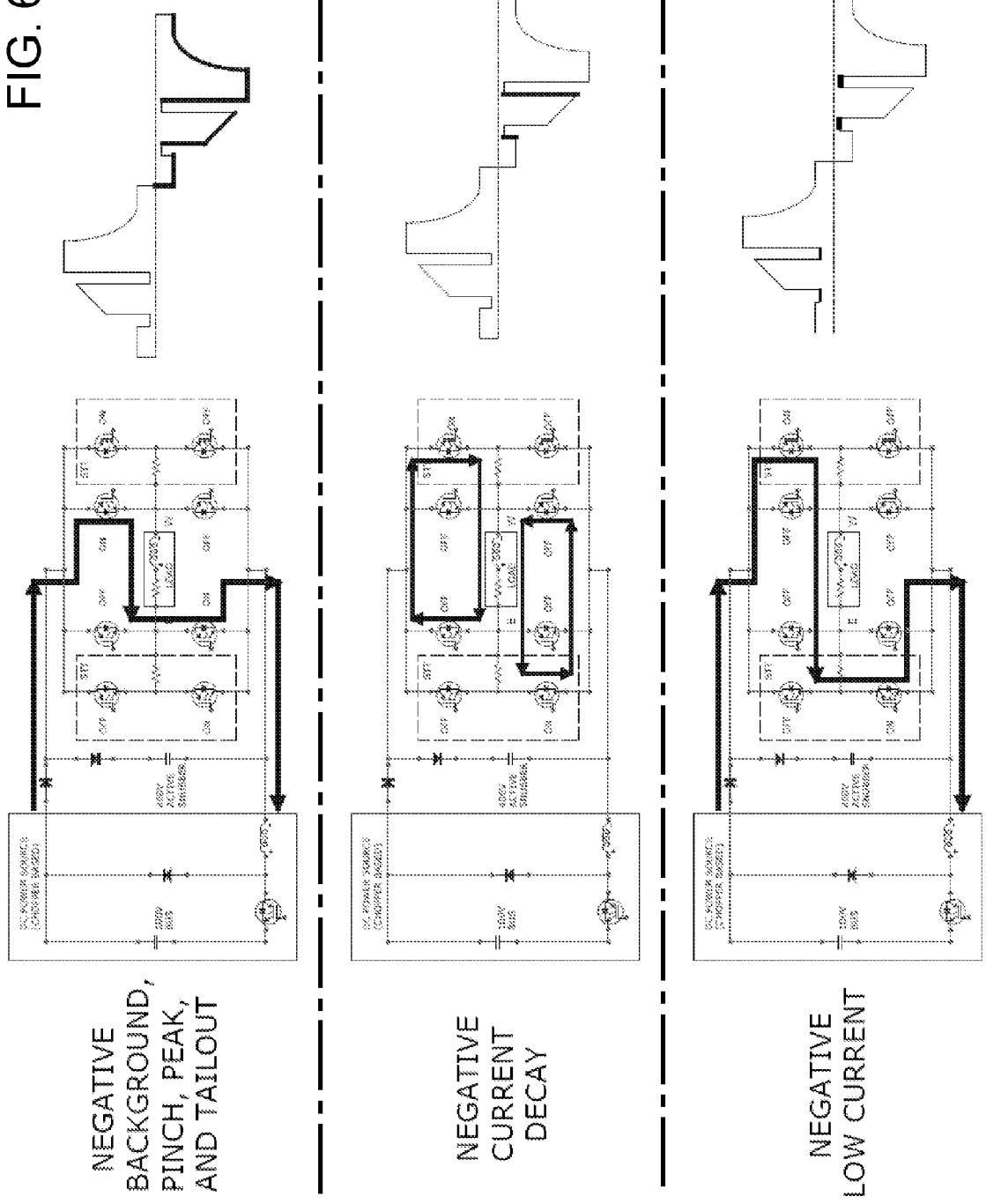

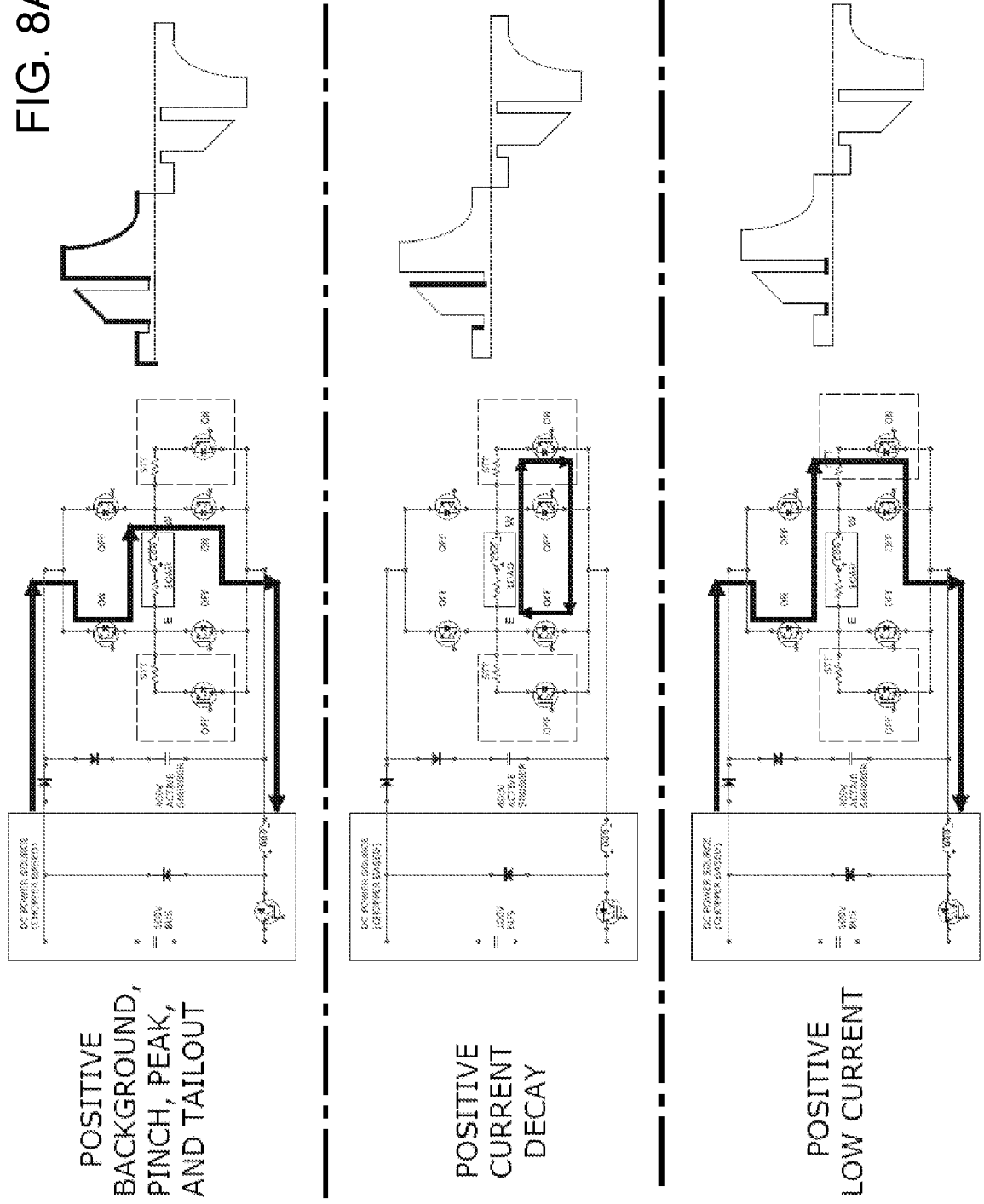

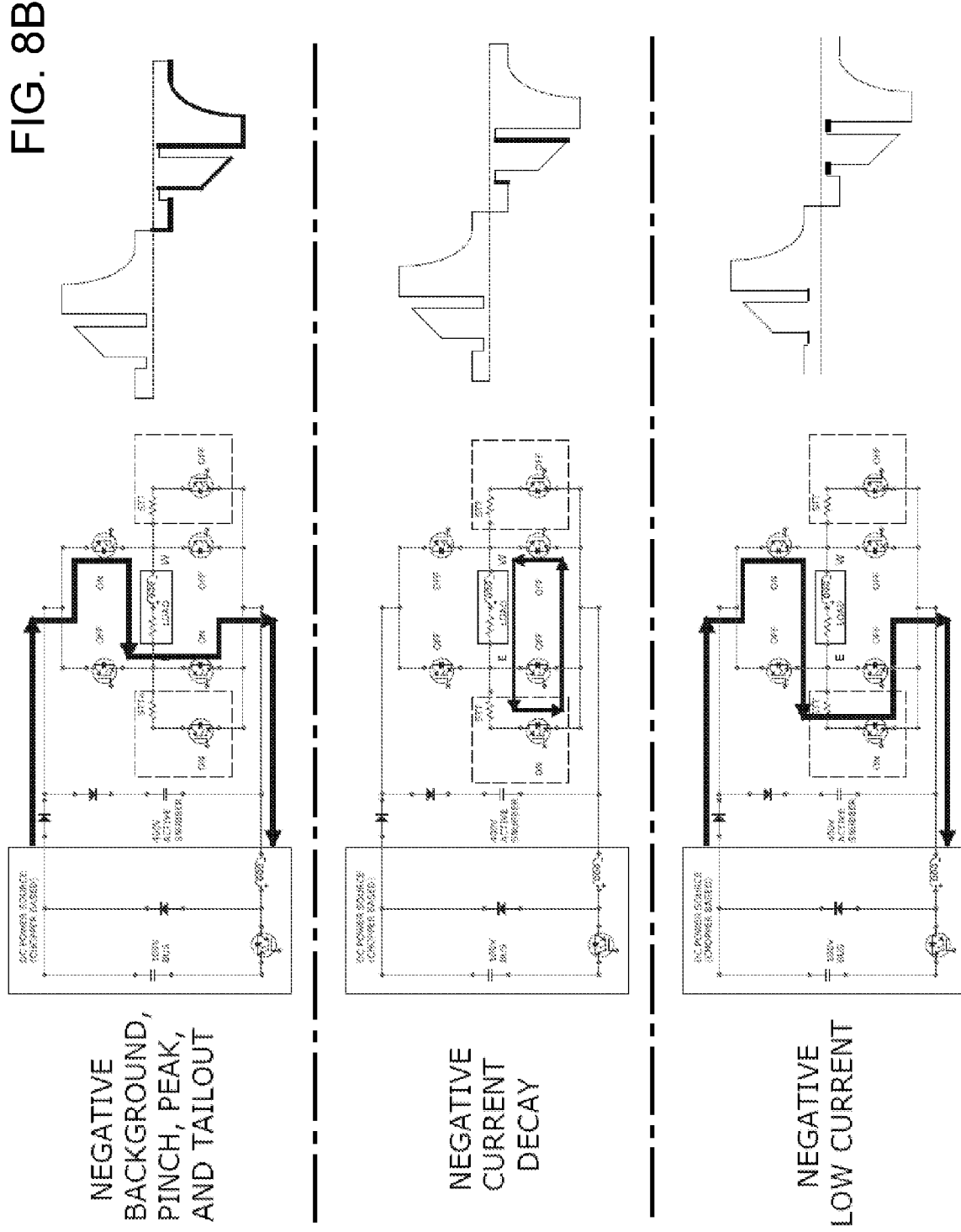

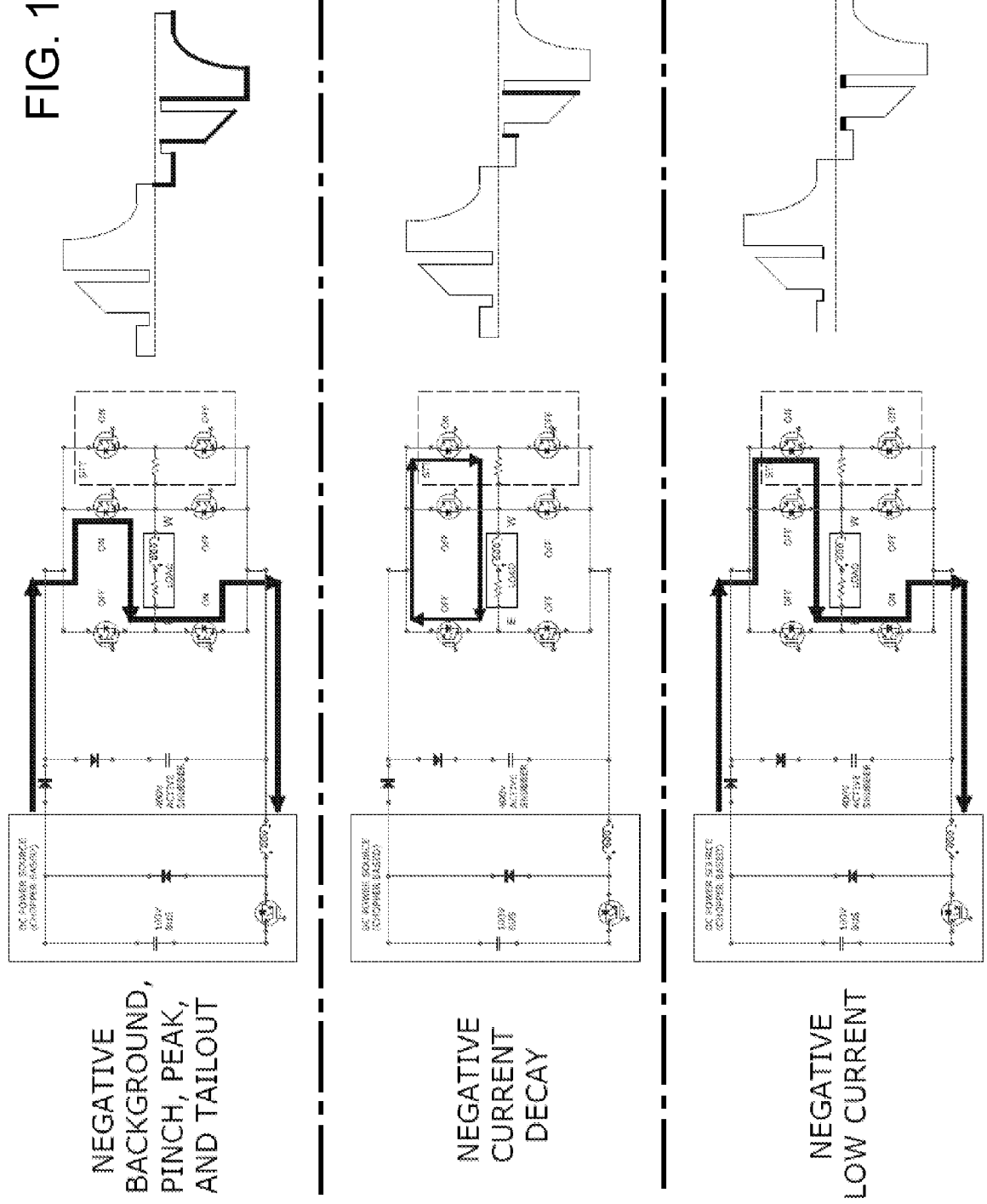

SYSTEMS AND METHODS PROVIDING CONTROLLED AC ARC WELDING PROCESSES

TECHNICAL FIELD

Certain embodiments of the present invention relate to arc welding. More particularly, certain embodiments of the present invention relate to systems and methods for providing controlled AC arc welding processes.

BACKGROUND

Certain prior art welding systems use bridge topologies in a welding power source to provide AC welding capability. A half-bridge topology may be used in a welding power source having dual output current paths configured to share a common path, such that each output can induce a flow of opposite polarity in the shared path. In practice, many welding power sources are configured as such and may require only the addition of a second set of rectifier devices to complete the second path. A switch may be placed in the non-shared path of each power source leg and the direction of current flow through a connected welding output circuit path is determined by the active leg. A full bridge topology may be used with just about any power source topology, providing flexibility and the potential to be added to existing designed power sources. The full bridge topology allows easy implementation of zero cross assisting circuits. A blocking diode may be used to protect the devices in the power source from high voltage transients that occur during the zero cross.

For certain short circuit transfer welding processes such as, for example, a surface tension transfer process, the output current must decay rapidly to specific values at certain points in the process. Techniques have been applied in the prior art to achieve such rapid reductions in output current in DC positive and DC negative applications. However, the ability to rapidly reduce the output current in both positive and negative directions in an AC arc welding process, while keeping leakage currents and spatter to a minimum and while allowing an arc to easily re-establish between a consumable electrode and a workpiece after the transfer of a molten metal ball from the electrode to the workpiece, is a challenging problem.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

Embodiments of the present invention include systems and methods for providing controlled AC arc welding processes. A means to introduce a high impedance path in the weld circuit of an AC output welding machine is provided for the purpose of rapidly decaying the arc current without letting the current go to zero, which would make it difficult to maintain the arc. AC welding, variable polarity welding (e.g., DC welding in either polarity), and other hybrid welding process are supported. Configurations of main and auxiliary bridge circuits allow for the directional switching of the output welding current through the welding output circuit path and selectively provide one or more high impedance paths to rapidly decay the arc current. The high impedance path aids in the low spatter transfer of molten metal balls (droplets) from a consumable electrode to a workpiece and further aids in the re-establishing or maintaining of an arc between the consumable electrode and the workpiece after a molten metal ball is transferred. In general, the high impedance path quenches the current when a droplet is about to transfer from the end of the consumable welding wire electrode to the workpiece during the welding process (e.g., surface tension may be used to pull the droplet across in a low spatter manner).

One embodiment of the present invention is a welding power source. The welding power source includes a power conversion circuit configured to convert an input current to an output current. The power conversion circuit may be transformer based with a half bridge output topology. The power conversion circuit may include a DC output topology. The power conversion circuit may be an inverter-based circuit or a chopper-based circuit, for example. The welding power source also includes a main bridge circuit operatively connected to the power conversion circuit and configured to switch a direction of the output current through a welding output circuit path operatively connected to a welding output of the welding power source at the command of a controller of the welding power source. The main bridge circuit may be configured as a half bridge circuit or as a full bridge circuit, for example. The main bridge circuit may include, for example, at least two switching transistors. The welding power source further includes an auxiliary bridge circuit operatively connected to the main bridge circuit and configured to introduce a high impedance path between the power conversion circuit and the welding output circuit path at the command of the controller of the welding power source. The auxiliary bridge circuit may include, for example, at least two switching transistors and at least one resistor. The resistance value of the at least one resistor may be less than two ohms or less than one ohm, in accordance with various embodiments. The power conversion circuit, the main bridge circuit, and the auxiliary bridge circuit may be configured to provide any of a DC positive welding operation, a DC negative welding operation, and an AC welding operation at the command of the controller of the welding power source. In accordance with an alternative embodiment, the main bridge circuit and the auxiliary bridge circuit may be external to the welding power source, for example, in the form of a module that operatively connects to the welding power source.

One embodiment of the present invention is a welding power source. The welding power source includes means for converting an input current to an output current and means for switching a direction of the output current through a welding output circuit path operatively connected to a welding output of the welding power source to provide at least an AC welding operation. The welding power source also includes means for rapidly reducing a level of the output current to a regulated non-zero level to provide a low spatter wet-in of a molten metal ball at an end of a consumable welding electrode into a weld puddle on a workpiece, and the automatic re-establishment of an arc between the end of the consumable welding electrode and the workpiece immediately after the molten metal ball has transferred to the workpiece.

One embodiment of the present invention is a method. The method includes converting an input current to an output current in a welding power source. The method also includes switching a direction of the output current through a welding output circuit path operatively connected to a welding output of the welding power source from a first direction to a second direction at the command of a controller of the welding power source. The method further includes selectively switching the output current through a high impedance path within the welding power source at the command of the controller of the welding power source to reduce a level of the output current to a regulated non-zero level while maintaining the second direction of the output current through the welding output circuit path. The method may also include switching a direction of the output current through the welding output circuit path from the second direction to the first direction at the command of the controller of the welding power source, and further selectively switching the output current through a high impedance path within the welding power source at the command of the controller of the welding power source to reduce a level of the output current to a regulated non-zero level while maintaining the first direction of the output current through the welding output circuit path. The high impedance path may include at least one switching transistor and at least one resistor.

One embodiment of the present invention is a method of generating a welding output current waveform within a welding power source. The method includes generating a positive current portion of the welding output current waveform followed by a negative current portion of the welding output current waveform. Each of the positive current portion and the negative current portion include a background current section followed by a first low current transition section followed by a pinch current section followed by a second low current transition section followed by a peak current section followed by a tail-out current section. The first low current transition section and the second low current transition section are each regulated to a non-zero level, being closer to a zero current level than a level of the background current section, by switching the welding output current waveform through a high impedance path within the welding power source during a time of the first low current transition section and during a time of the second low current transition section, respectively. The high impedance path may include at least one switching transistor and at least one resistor. When the welding output current waveform is applied to a welding output circuit path having a consumable welding electrode and a workpiece, the regulated non-zero level of the first low current transition section may provide a low spatter wet-in of a molten metal ball at an end of the consumable welding electrode into a weld puddle on the workpiece. Furthermore, when the welding output current waveform is applied to a welding output circuit path having a consumable welding electrode and a workpiece, the regulated non-zero level of the second low current transition section may provide the automatic re-establishment of an arc between an end of the consumable welding electrode and the workpiece immediately after the transition of a molten metal ball from an end of the consumable welding electrode to the workpiece.

One embodiment of the present invention is a welding power source. The welding power source includes a hybrid bridge circuit configured to provide an AC welding output current and further configured to selectively provide a high impedance path for the AC welding output current. The high impedance path includes at least one transistor switch and at least one resistor.

One embodiment of the present invention is a welding power source. The welding power source includes a hybrid bridge circuit configured to provide an AC welding output current and further configured to selectively provide a low impedance path and a high impedance path for the AC welding output current wherein, the high impedance path mimics the polarity of the low impedance path.

One embodiment of the present invention is a welding power source. The welding power source includes a hybrid bridge circuit having a low impedance path and a high impedance path, wherein the hybrid bridge circuit is configured for the low impedance path to be selectively interrupted to force an output current through the high impedance path to increase a voltage across a load connected to a welding output of the welding power source.

Details of illustrated embodiments of the present invention will be more fully understood from the following description and drawings.

BRIEF DESCRIPTION OF THE DRAWINGS

FIGS. 6A-6B illustrate the operation of the portion of the welding power source in FIG. 5 when implementing an AC version of the welding output current waveform of FIG. 2;

FIGS. 8A-8B illustrate the operation of the portion of the welding power source in FIG. 7 when implementing an AC version of the welding output current waveform of FIG. 2;

FIGS. 10A-10B illustrate the operation of the portion of the welding power source in FIG. 9 when implementing an AC version of the welding output current waveform of FIG. 2.

DETAILED DESCRIPTION

Figure 1:
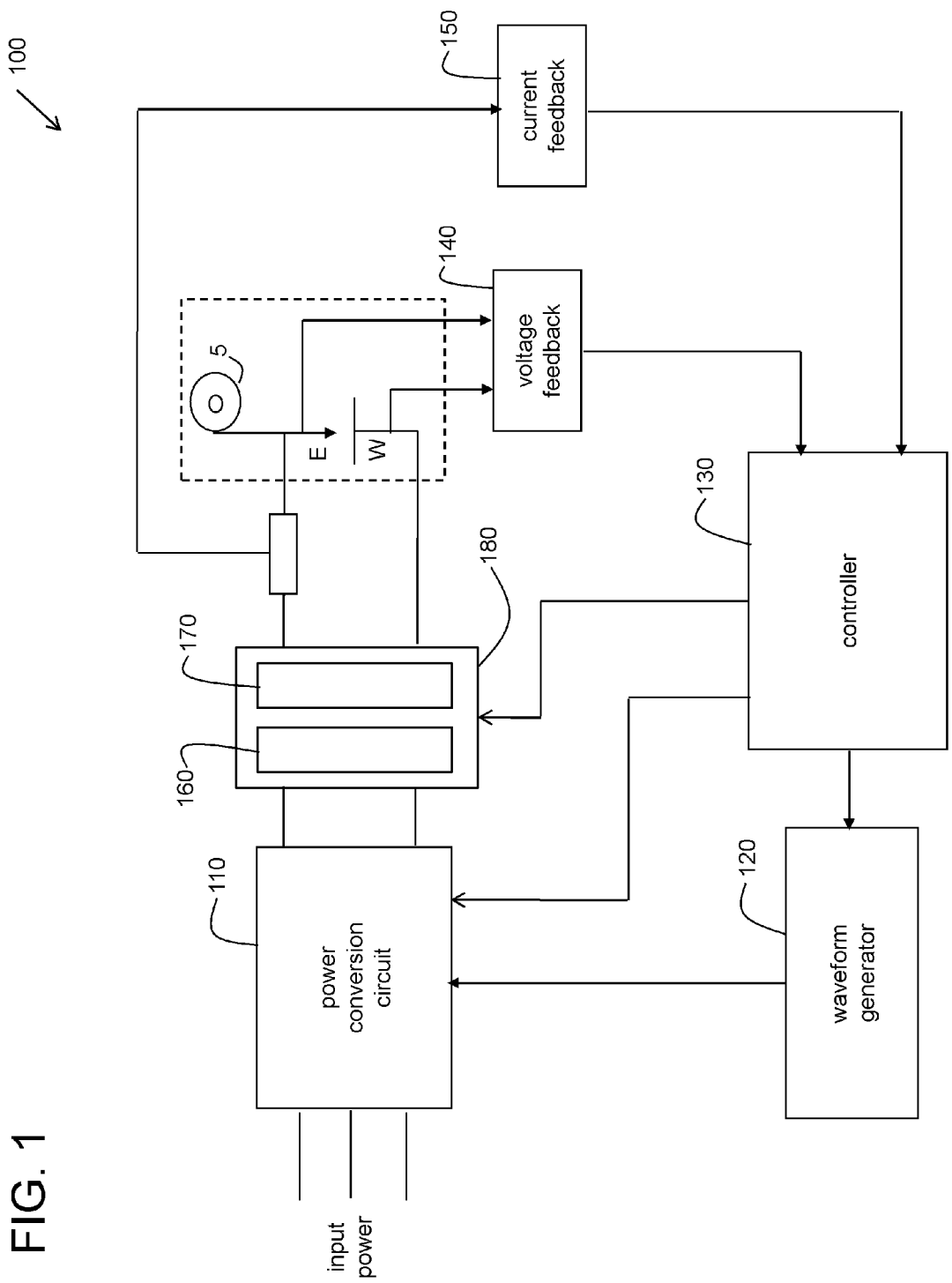
FIG. 1 illustrates a schematic block diagram of an exemplary embodiment of a welding power source operatively connected to a consumable welding electrode and a workpiece.

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Welding tool", as used herein, refers to, but is not limited to, a welding gun, a welding torch, or any welding device that accepts a consumable welding wire for the purpose of applying electrical power to the consumable welding wire provided by a welding power source.

"Welding output circuit path", as used herein, refers to the electrical path from a first side of the welding output of a welding power source, through a first welding cable (or a first side of a welding cable), to a welding electrode, to a workpiece (either through a short or an arc between the welding electrode and the workpiece), through a second welding cable (or a second side of a welding cable), and back to a second side of the welding output of the welding power source.

"Welding cable", as used herein, refers to the electrical cable that may be connected between a welding power source and a welding electrode and workpiece (e.g. through a welding wire feeder) to provide electrical power to create an arc between the welding electrode and the workpiece.

"Welding output", as used herein, may refer to the electrical output circuitry or output port or terminals of a welding power source, or to the electrical power, voltage, or current provided by the electrical output circuitry or output port of a welding power source.

"Computer memory", as used herein, refers to a storage device configured to store digital data or information which can be retrieved by a computer or processing element.

"Controller", as used herein, refers to the logic circuitry and/or processing elements and associated software or program involved in controlling a welding power source.

The terms "signal", "data", and "information" may be used interchangeably herein and may be in digital or analog form.

The term "AC welding" is used generally herein and may refer to actual AC welding, DC welding in both positive and negative polarities, variable polarity welding, and other hybrid welding processes.

FIG. 1 illustrates a schematic block diagram of an exemplary embodiment of a welding power source 100 operatively connected to a consumable welding electrode E and a workpiece W. The welding power source 100 includes a power conversion circuit 110 providing welding output power between the welding electrode E and the workpiece W. The power conversion circuit 110 may be transformer based with a half bridge output topology. For example, the power conversion circuit 110 may be of an inverter type that includes an input power side and an output power side, for example, as delineated by the primary and secondary sides, respectively, of a welding transformer. Other types of power conversion circuits are possible as well such as, for example, a chopper type having a DC output topology. A wire feeder 5 feeds the consumable wire welding electrode E toward the workpiece W. The wire feeder 5, the consumable welding electrode E, and the workpiece W are not part of the welding power source 100 but may be operatively connected to the welding power source 100 via a welding output cable.

The welding power source 100 further includes a waveform generator 120 and a controller 130. The waveform generator 120 generates welding waveforms at the command of the controller 130. A waveform generated by the waveform generator 120 modulates the output of the power conversion circuit 110 to produce the welding output current between the electrode E and the workpiece W.

The welding power source 100 may further include a voltage feedback circuit 140 and a current feedback circuit 150 to monitor the welding output voltage and current between the electrode E and the workpiece W and provide the monitored voltage and current back to the controller 130. The feedback voltage and current may be used by the controller 130 to make decisions with respect to modifying the welding waveform generated by the waveform generator 120 and/or to make other decisions that affect safe operation of the welding power source 100, for example.

The welding power source 100 also includes a hybrid bridge circuit 180 having a main bridge circuit 160 and an auxiliary bridge circuit 170. The main bridge circuit 160 is operatively connected to the power conversion circuit 110 and is configured to switch a direction of the output current through a low impedance welding output circuit path (including the electrode E and the workpiece W) operatively connected to a welding output of the welding power source 100 at the command of the controller 130. The auxiliary bridge circuit is operatively connected to the main bridge circuit and is configured to introduce a high impedance path between the power conversion circuit 110 and the welding output circuit path at the command of the controller 130. In accordance with one embodiment, the high impedance path mimics the low impedance path in the sense of the provided direction (polarity) of the output current through the welding output circuit path. Detailed examples and operation of such hybrid bridge circuits are described in detail later herein.

Figure 2:
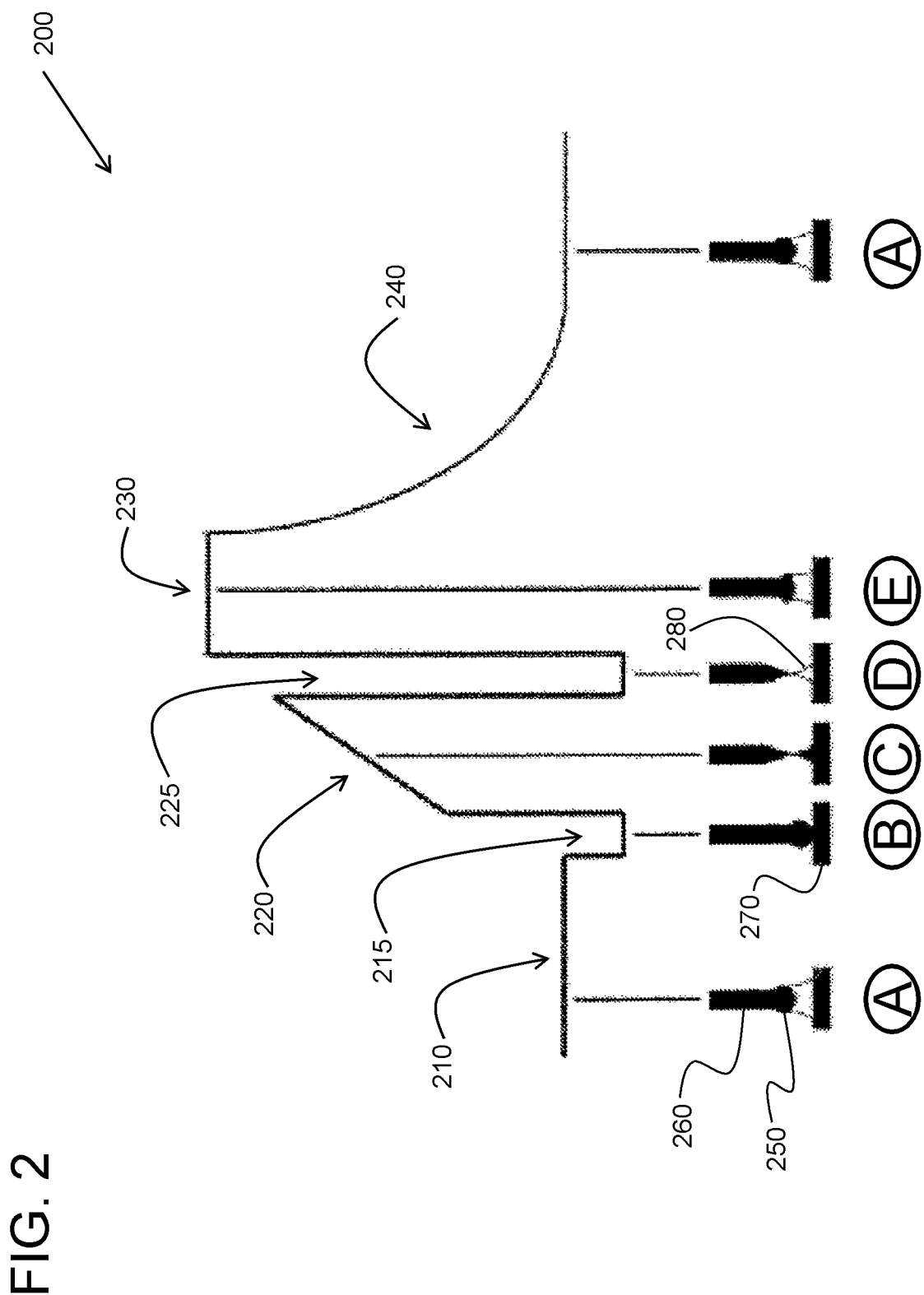
FIG. 2 illustrates an exemplary embodiment of a welding output current waveform.

FIG. 2 illustrates an exemplary embodiment of a welding output current waveform 200. The waveform 200 is designed for use in a short circuit transfer welding process known as a surface tension transfer (STT) process. The waveform 200 includes a background current section 210, a pinch current section 220, a peak current section 230, and a tail-out current section 240. In between the background current section 210 and the pinch current section 220 is a first low current transition section 215. Also, in between the pinch current section 220 and the peak current section 230 is a second low current transition section 225.

During a welding operation using the waveform 200, during time A as illustrated in FIG. 2 (i.e., during the background current section 210), a molten metal ball 250 is produced at the end of a consumable welding electrode 260. During time B as illustrated in FIG. 2 (i.e., during the first low current transition section 215), the molten metal ball 260 shorts to the workpiece 270 and the current is reduced, allowing the molten metal ball 250 to wet into a puddle on the workpiece 270. During time C as illustrated in FIG. 2 (i.e., during the pinch current section 220), a ramped pinch current is applied to the short to help the molten metal ball 250 pinch off from the end of the electrode 260 into the puddle on the workpiece 270. During time D as illustrated in FIG. 2 (i.e., during the second low current transition section 225), the current is reduced, allowing a welding arc 280 to easily re-establish between the electrode 260 and the workpiece 270 after the molten metal ball 250 has pinched off from the electrode 260, clearing the short. During time E as illustrated in FIG. 2 (i.e., during the peak current section 230), peak current is applied to set the proper arc length of the re-established arc and to begin melting a new molten metal ball from the end of the electrode. During the tail-out current section 240, generated heat is controlled by controlling the rate at which the current transitions from a peak current level to a background current level. The waveform repeats during the welding process to form a weld.

As an example, a background current of 100 amps maintains the arc between the electrode and the workpiece and contributes to base metal heating. After the electrode initially shorts to the weld pool on the workpiece, the current is quickly reduced to ensure a solid short. The pinch current is then applied to squeeze molten metal down into the weld pool while monitoring the necking of the liquid bridge from electrical signals. When the liquid bridge is about to break, the power source reacts by reducing the current to about 50 amps. Immediately following the arc re-establishment, a peak current is applied to produce plasma force, pushing down the weld pool to prevent accidental shorting and to heat the puddle and the weld joint. The exponential tail-out section is adjusted to regulate overall heat input and the background current section serves as a fine heat control.

In accordance with an embodiment of the present invention, the currents of the first low current transition section 215 and the second low current transition section 225 are quickly reduced and regulated to a non-zero level, being closer to a zero current level than the level of the background current section 210, by switching the welding output current waveform 200 through a high impedance path within the welding power source 100. By reducing the current quickly and regulating to a low non-zero level, spatter is reduced, low spatter transfer of the molten metal ball is facilitated, and the arc 280 is readily re-established between the electrode 260 and the workpiece 270 in a reliable manner. Embodiments of the present invention provide a hybrid bridge circuit being under the control of the controller 130 to switch in the high impedance path at the appropriate times while providing AC welding operation, as described in detail below herein. Certain aspects of the methods described herein may also be applied to non-shorting welding processes, where the molten metal ball breaks free of the electrode before touching the workpiece and transfers across the arc without the arc being extinguished. In such non-shorting welding processes, the high impedance path of the hybrid bridge circuit may be used to facilitate the low spatter transfer of the molten metal ball across the arc while maintaining the arc.

Figure 3:
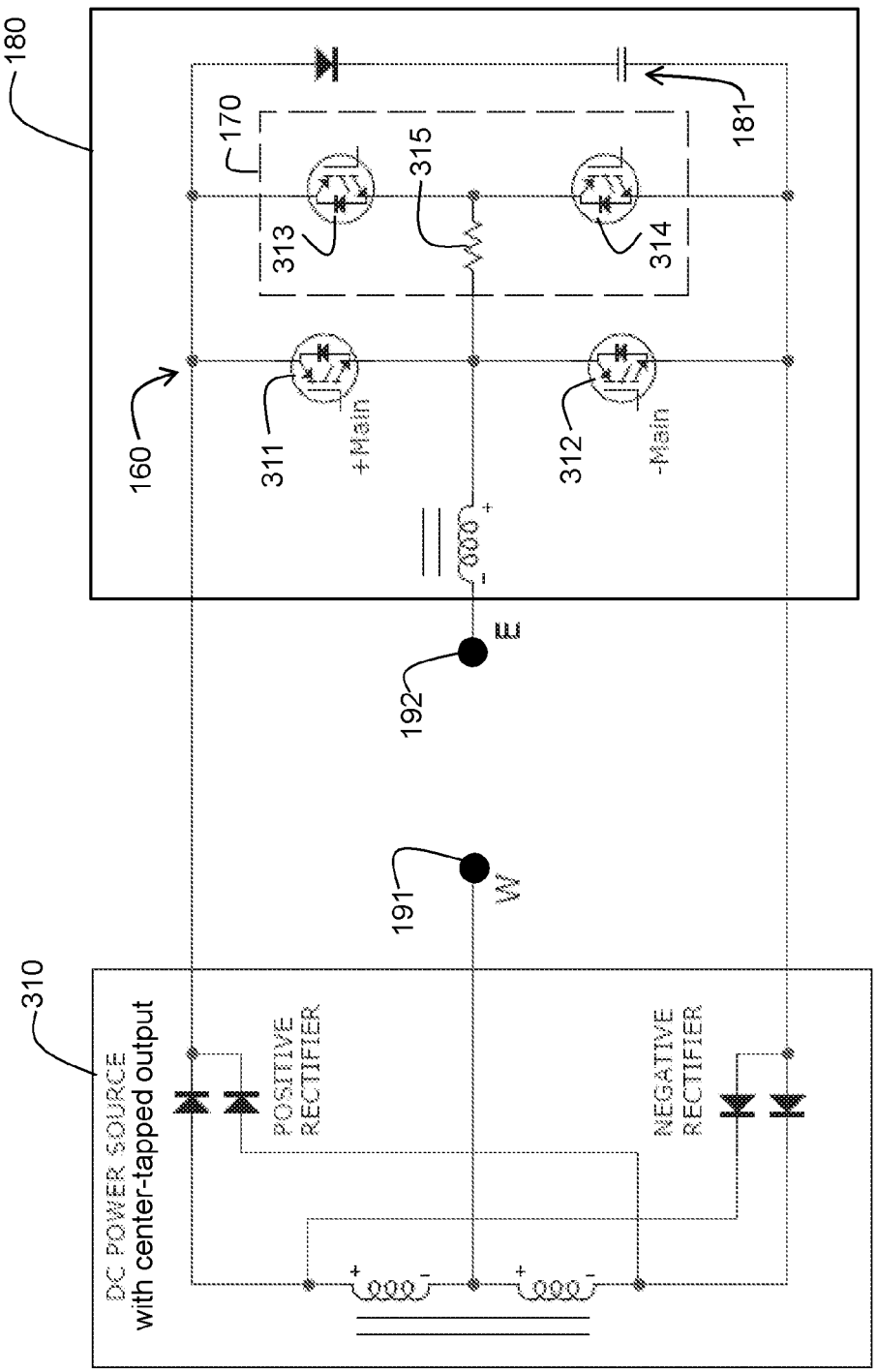
FIG. 3 illustrates a schematic diagram of a first exemplary embodiment of a portion of the welding power source of FIG. 1 having a main bridge circuit and an auxiliary bridge circuit.

FIG. 3 illustrates a schematic diagram of a first exemplary embodiment of a portion of the welding power source 100 of FIG. 1 having a hybrid bridge circuit 180 including a main bridge circuit 160 and an auxiliary bridge circuit 170. Also illustrated in FIG. 3 is a portion 310 of the power conversion circuit 110, where the power conversion circuit 110 is a center-tapped or half bridge topology (e.g., an inverter-based circuit). The hybrid bridge circuit 180 of FIG. 3 is in the form of a half bridge topology where the power conversion circuit 110 provides dual output current paths configured to share a common path, such that each output path can induce a flow of opposite polarity in the shared path. The main bridge circuit 160 includes switching transistors 311 and 312. The auxiliary bridge circuit 170 includes switching transistors 313 and 314, and resistor 315. In accordance with an embodiment, the switching transistors are insulated gate bipolar transistors (IGBTs). An active snubber 181 is used to limit the voltage across the bridge circuit 180 (e.g., somewhere between 300 V and 600 V) to cause the output current through the output circuit path to fall quickly. The hybrid bridge circuit 180 of FIG. 3 provides for AC welding operation and provides a high impedance path to regulate the welding output current to a low level for spatter control and to re-establish the welding arc between the electrode E and the workpiece W at certain time intervals during the welding process, as described herein with respect to FIG. 2 and FIGS. 4A-4B. Welding output terminals 191 and 192 are shown and represent the welding output of the welding power source to which the electrode E and the workpiece W may be connected through a welding cable path.

Figure 4A:
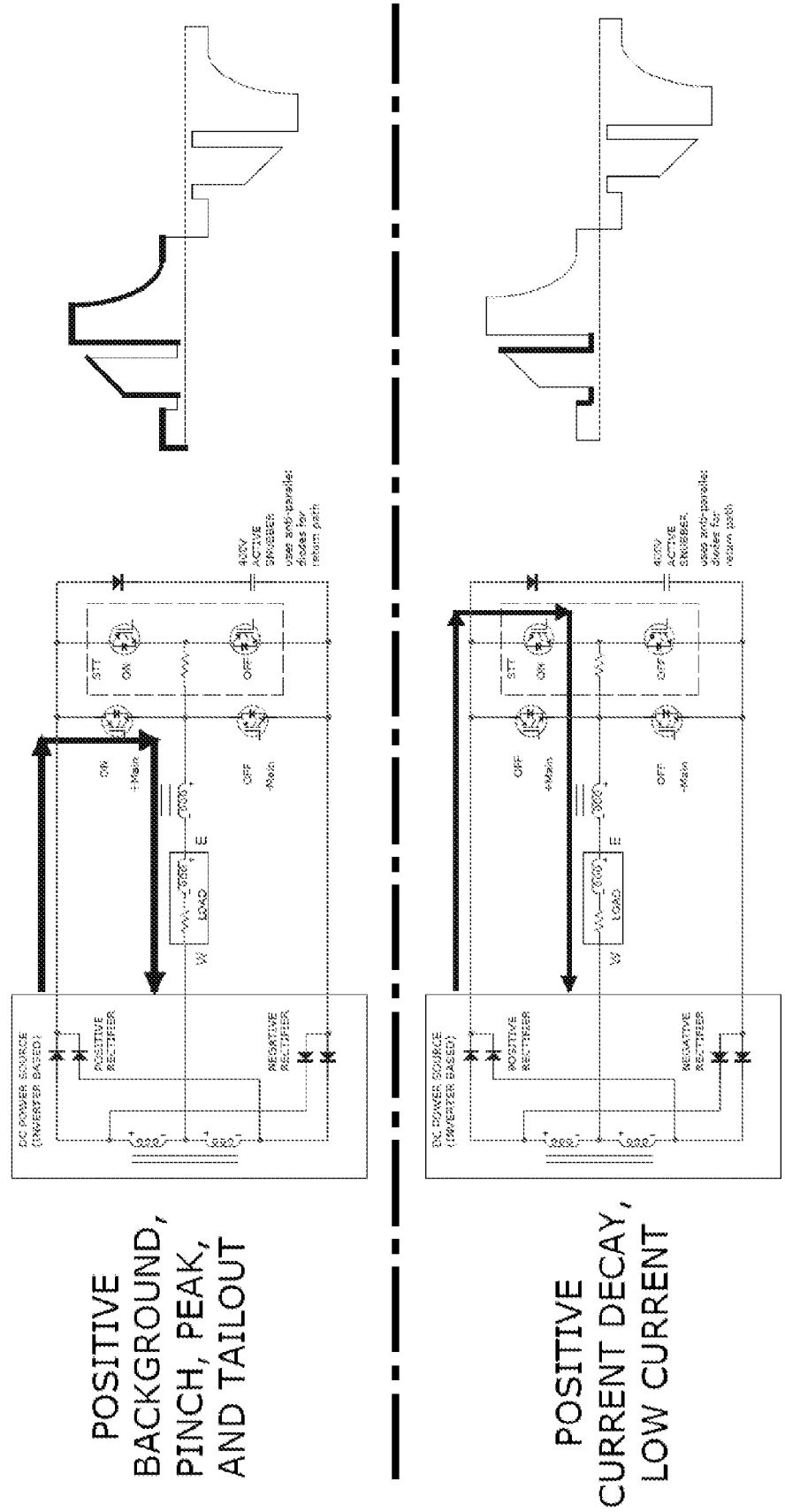
FIGS. 4A-4B illustrate the operation of the portion of the welding power source in FIG. 3 when implementing an AC version of the welding output current waveform of FIG. 2.
Figure 4B:
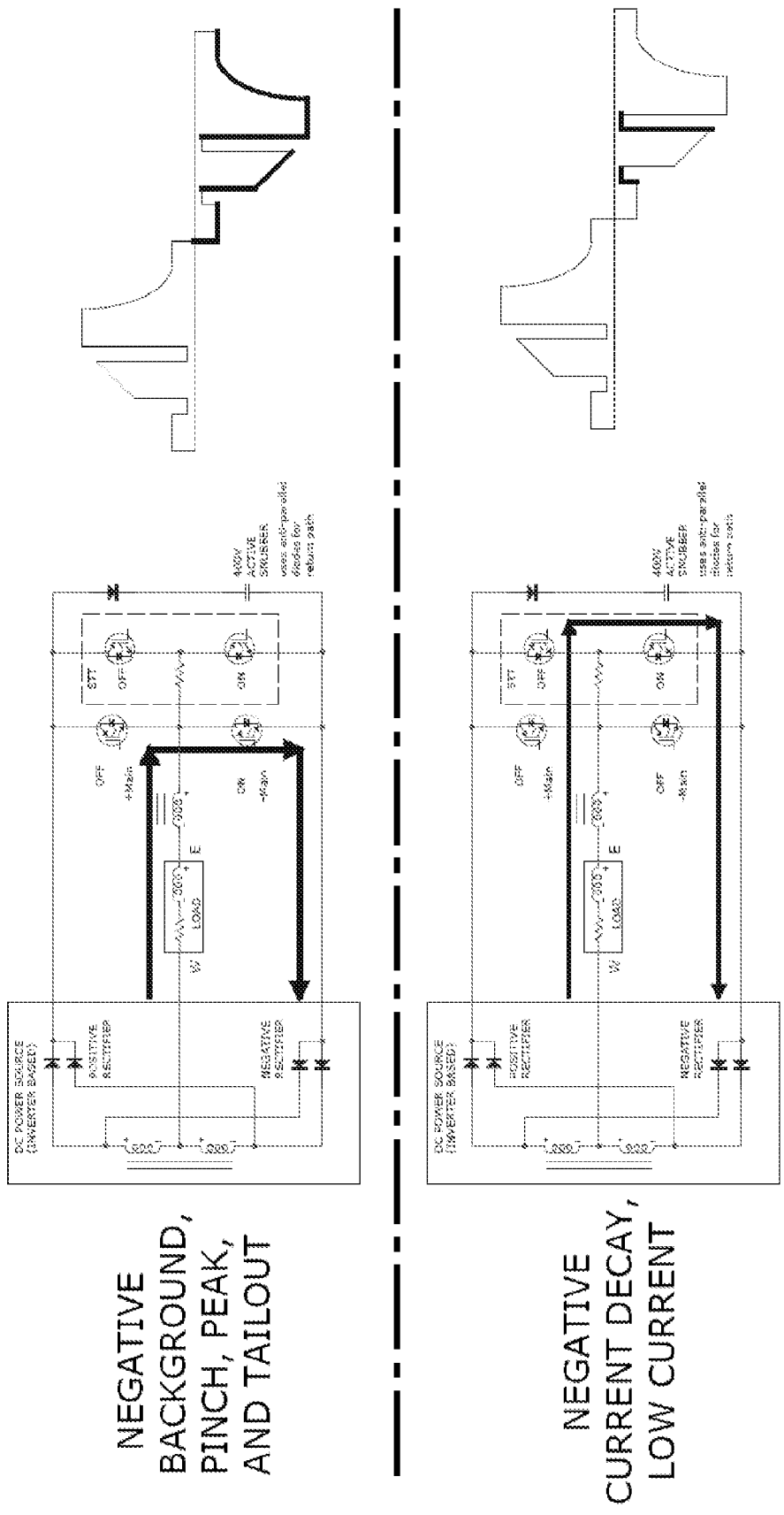

FIGS. 4A-4B illustrate the operation of the portion of the welding power source in FIG. 3 when implementing an AC version of the welding output current waveform 200 of FIG. 2. FIG. 4A illustrates operation of the circuit of FIG. 3 during a positive portion of the welding output current waveform 200. During times of the background current section 210, the pinch current section 220, the peak current section 230, and the tail-out current section 240 (shown by the bolded portion of the waveform in the top portion of FIG. 4A), the switching transistor 311 of the main bridge circuit 160 is ON and the switching transistor 312 of the main bridge circuit 160 is OFF. As a result, the welding output current flows as indicated by the solid arrows in the top portion of FIG. 4A through a low impedance path.

During the times of current decay and the low current transition sections 215 and 225 (shown by the bolded portion of the waveform in the bottom portion of FIG. 4A), only the switching transistor 313 of the auxiliary bridge circuit 170 is ON. As a result, the welding output current flows through the high impedance path provided by the switching transistor 313 and the resistor 315 as indicated by the solid arrows in the bottom portion of FIG. 4A, providing a high potential drop between the electrode E and the workpiece W, thus allowing the welding output current to quickly decay and be regulated to a determined low level. This creates a high potential situation between the electrode E and the workpiece W, thus forcing the welding output current to quickly decay in accordance with the well known equation $V=L(di/dt)$ where V is voltage, L is inductance, di is change in current, and dt is change in time.

In accordance with an embodiment of the present invention, a value of the resistor 315 is less than two ohms (e.g., one ohm). In accordance with another embodiment, a value of the resistor 315 is less than one ohm (e.g., 0.5 ohms). Again, such quick decaying and regulation of the welding output current with the hybrid bridge circuit 180 provide for low spatter conditions and reliable re-establishment of the arc between the electrode E and the workpiece W. The load shown in FIGS. 4A-4B represents the resistance and inductance of the arc between the electrode E and the workpiece W and the welding cable path connecting the electrode E and workpiece W to the welding power source (i.e., the welding output circuit path). The electrode E, workpiece W, and the welding cable path are not a part of the welding power source, however. Providing an auxiliary bridge circuit 170 to the main bridge circuit 160 allows better control of the interruption of welding output current through the load.

Similarly, FIG. 4B illustrates operation of the circuit of FIG. 3 during a negative portion of the welding current waveform. During times of the background current section 210, the pinch current section 220, the peak current section 230, and the tail-out current section 240 (shown by the bolded portion of the waveform in the top portion of FIG. 4B), the switching transistor 312 of the main bridge circuit 160 is ON and the switching transistor 311 of the main bridge circuit 160 is OFF. As a result, the welding output current flows as indicated by the solid arrows in the top portion of FIG. 4B. During the times of current decay and the low current transition sections 215 and 225 (shown by the bolded portion of the waveform in the bottom portion of FIG. 4B), only the switching transistor 314 of the auxiliary bridge circuit 170 is ON. As a result, the welding output current flows through the high impedance path provided by the switching transistor 314 and the resistor 315 as indicated by the solid arrows in the bottom portion of FIG. 4B, providing a high potential drop between the electrode E and the workpiece W, thus allowing the welding output current to quickly decay and be regulated to a determined low level. Again, such quick decaying and regulation of the welding output current provides for low spatter conditions and reliable re-establishment of the arc between the electrode E and the workpiece W. In accordance with an embodiment of the present invention, the switching transistors are controlled (turned ON and OFF) by the controller 130.

In accordance with certain embodiments, the high impedance path mimics the low impedance path in the sense of the provided direction (polarity) of the currents through the hybrid bridge circuit. That is, the auxiliary bridge follows the polarity of the main bridge and, at certain times, the main bridge is interrupted to introduce the high impedance path provided by the auxiliary bridge. Such mimicking may be accomplished by switching corresponding transistors of the main bridge circuit and the auxiliary bridge circuit in the same manner at the same time. Furthermore, such mimicking may ease the transition to the high impedance path and/or provide for more efficient timing and switching. However, other embodiments may unlink the polarity-following nature of the auxiliary bridge circuit to the main bridge circuit.

In general, during transfer of a molten metal ball 250, the main bridge circuit 160 opens, leaving the auxiliary bridge circuit 170 to provide a high impedance path without interrupting current flow. Without the auxiliary bridge circuit 170, the main bridge circuit 160 would have to be completely interrupted such that the only decay path would be through the active snubber 181, allowing the welding output current to fall to zero. Such operation without the auxiliary bridge circuit 170 would not provide the reliable, controlled low spatter conditions and arc re-establishment that are desired.

Figure 5:
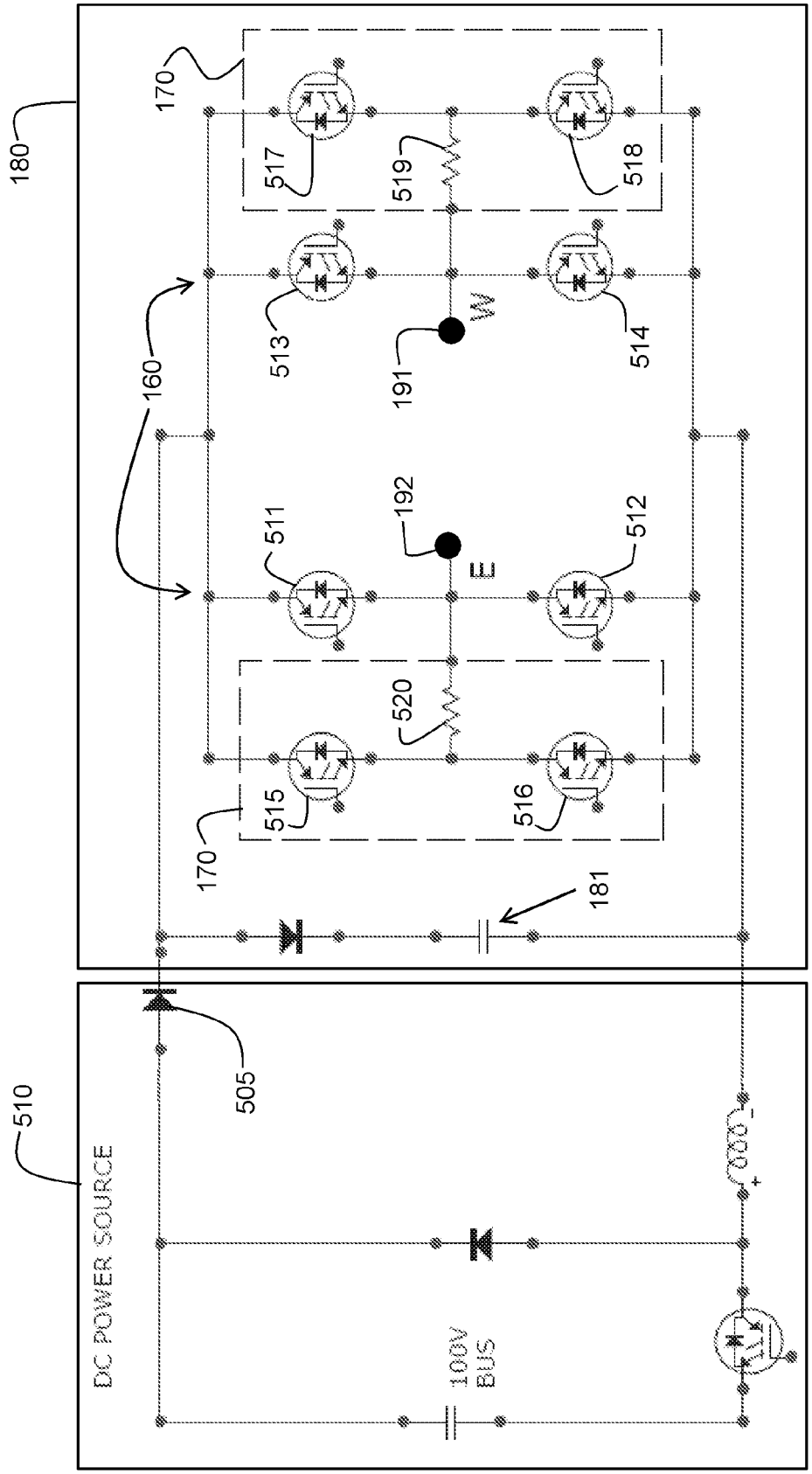
FIG. 5 illustrates a schematic diagram of a second exemplary embodiment of a portion of the welding power source of FIG. 1 having a main bridge circuit and an auxiliary bridge circuit.

FIG. 5 illustrates a schematic diagram of a second exemplary embodiment of a portion of the welding power source 100 of FIG. 1 having a hybrid bridge circuit 180 including a main bridge circuit 160 and an auxiliary bridge circuit 170. Also illustrated in FIG. 5 is a portion 510 of the power conversion circuit 110, where the power conversion circuit 110 provides a DC+ and DC− output (e.g., a chopper-based circuit). The hybrid bridge circuit 180 of FIG. 5 is in the form of a full bridge topology that may be used with almost any power source topology, providing flexibility and the potential to be added to existing designed power sources. The main bridge circuit 160 includes switching transistors 511, 512, 513, and 514. The auxiliary bridge circuit 170 includes switching transistors 515, 516, 517, and 518, and resistors 519 and 520. In accordance with an embodiment, the switching transistors are insulated gate bipolar transistors (IGBTs). An active snubber 181 is used to limit the voltage across the bridge circuit 180. The hybrid bridge circuit 180 of FIG. 5 provides for AC welding operation and provides high impedance paths to regulate the welding output current to a low level for spatter control and to re-establish the welding arc between the electrode E and the workpiece W at certain time intervals during the welding process, as described herein with respect to FIG. 2 and FIGS. 6A-6B. Welding output terminals 191 and 192 are shown and represent the welding output of the welding power source to which the electrode E and the workpiece W may be connected through a welding cable path.

Figure 6A:
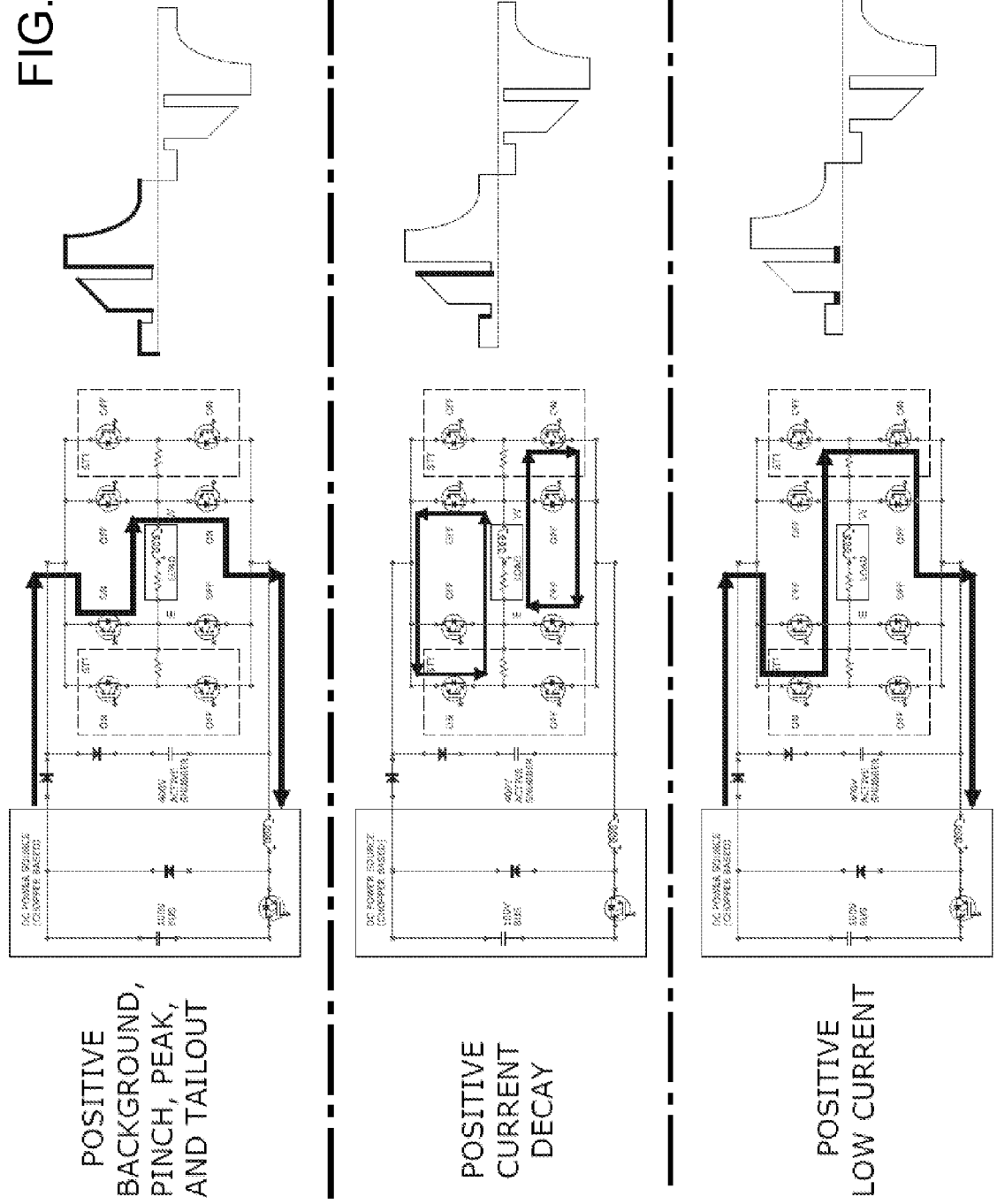

FIGS. 6A-6B illustrate the operation of the portion of the welding power source in FIG. 5 when implementing an AC version of the welding output current waveform 200 of FIG. 2. FIG. 6A illustrates operation of the circuit of FIG. 5 during a positive portion of the welding output current waveform 200. During times of the background current section 210, the pinch current section 220, the peak current section 230, and the tail-out current section 240 (shown by the bolded portion of the waveform in the top portion of FIG. 6A), the switching transistors 511 and 514 of the main bridge circuit 160 are ON and the switching transistors 512 and 513 of the main bridge circuit 160 are OFF. As a result, the welding output current flows as indicated by the solid arrows in the top portion of FIG. 6A.

During the times of current decay (shown by the bolded portion of the waveform in the middle portion of FIG. 6A), only the switching transistors 515 and 518 of the auxiliary bridge circuit 170 are ON. As a result, the diode 505 becomes reverse biased, preventing the flow of current from the power conversion circuit, and the energy stored in the load (due to inductance of the load) acts as a source of current. In general, the welding output current decays through two parallel circuits including the full bridge anti-parallel diodes in the switching transistors and the auxiliary bridge resistors as shown in the middle portion of FIG. 6A. More particularly, the energy stored in the load dissipates by having the welding output current flow through the high impedance paths provided by the switching transistors 515 and 518 of the auxiliary bridge circuit, the resistors 519 and 520 of the auxiliary bridge circuit, and the anti-parallel diodes of the switching transistors 512 and 513 of the main bridge circuit as indicated by the solid arrows in the middle and bottom portions of FIG. 6A. This creates a high potential situation between the electrode E and the workpiece W, thus forcing the welding output current to quickly decay in accordance with the well known equation V=L(di/dt) where V is voltage, L is inductance, di is change in current, and dt is change in time. In accordance with an embodiment of the present invention, a value of the resistors 519 and 520 is less than two ohms (e.g., one ohm). In accordance with another embodiment, a value of the resistors 519 and 520 is less than one ohm (e.g., 0.5 ohms).

During the times of the low current transition sections 215 and 225 (shown by the bolded portion of the waveform in the bottom portion of FIG. 6A), again, only the switching transistors 515 and 518 of the auxiliary bridge circuit 170 are ON. Once the energy stored in the load has dissipated as described above, the diode 505 becomes forward biased and current flows from the power conversion circuit again. As a result, the welding output current flows through the high impedance paths provided by the switching transistors 515 and 518 and the resistors 519 and 520 as indicated by the solid arrows in the bottom portion of FIG. 6A, allowing the welding output current to be regulated to a determined low level.

Again, such quick decaying and regulation of the welding output current with the hybrid bridge circuit 180 provide for low spatter conditions and reliable re-establishment of the arc between the electrode E and the workpiece W. The load shown in FIGS. 6A-6B represents the resistance and inductance of the arc between the electrode E and the workpiece W and the welding cable path connecting the electrode E and workpiece W to the welding power source. The electrode E, workpiece W, and the welding cable path are not a part of the welding power source, however.

Similarly, FIG. 6B illustrates operation of the circuit of FIG. 5 during a negative portion of the welding current waveform. During times of the background current section 210, the pinch current section 220, the peak current section 230, and the tail-out current section 240 (shown by the bolded portion of the waveform in the top portion of FIG. 6B), the switching transistors 512 and 513 of the main bridge circuit 160 are ON and the switching transistors 511 and 514 of the main bridge circuit 160 are OFF. As a result, the welding output current flows as indicated by the solid arrows in the top portion of FIG. 6B.

During the times of current decay (shown by the bolded portion of the waveform in the middle portion of FIG. 6B), only the switching transistors 516 and 517 of the auxiliary bridge circuit 170 are ON. As a result, the diode 505 becomes reverse biased, preventing the flow of current from the power conversion circuit, and the energy stored in the load (due to inductance of the load) acts as a source of current. In general, the welding output current decays through two parallel circuits including the full bridge anti-parallel diodes in the switching transistors and the auxiliary bridge resistors as shown in the middle portion of FIG. 6B. More particularly, the energy stored in the load dissipates by having the welding output current flow through the high impedance paths provided by the switching transistors 516 and 517 of the auxiliary bridge circuit, the resistors 519 and 520 of the auxiliary bridge, and the anti-parallel diodes of the switching transistors 511 and 514 of the main bridge circuit as indicated by the solid arrows in the middle and bottom portions of FIG. 6B. This creates a high potential situation between the electrode E and the workpiece W, thus forcing the welding output current to quickly decay.

During the times of the low current transition sections 215 and 225 (shown by the bolded portion of the waveform in the bottom portion of FIG. 6A), again, only the switching transistors 516 and 517 of the auxiliary bridge circuit 170 are ON. Once the energy stored in the load has dissipated as described above, the diode 505 becomes forward biased and current flows from the power conversion circuit again. As a result, the welding output current flows through the high impedance paths provided by the switching transistors 516 and 517 and the resistors 519 and 520 as indicated by the solid arrows in the bottom portion of FIG. 6B, allowing the welding output current to be regulated to a determined low level.

In general, during transfer of a molten metal ball 250, the main bridge circuit 160 opens, leaving the auxiliary bridge circuit 170 to provide a high impedance path without interrupting current flow. Without the auxiliary bridge circuit 170, the main bridge circuit 160 would have to be completely interrupted such that the only decay path would be through the active snubber 181, allowing the welding output current to fall to zero. Such operation without the auxiliary bridge circuit 170 would not provide the reliable, controlled low spatter conditions and arc re-establishment that are desired.

Figure 7:
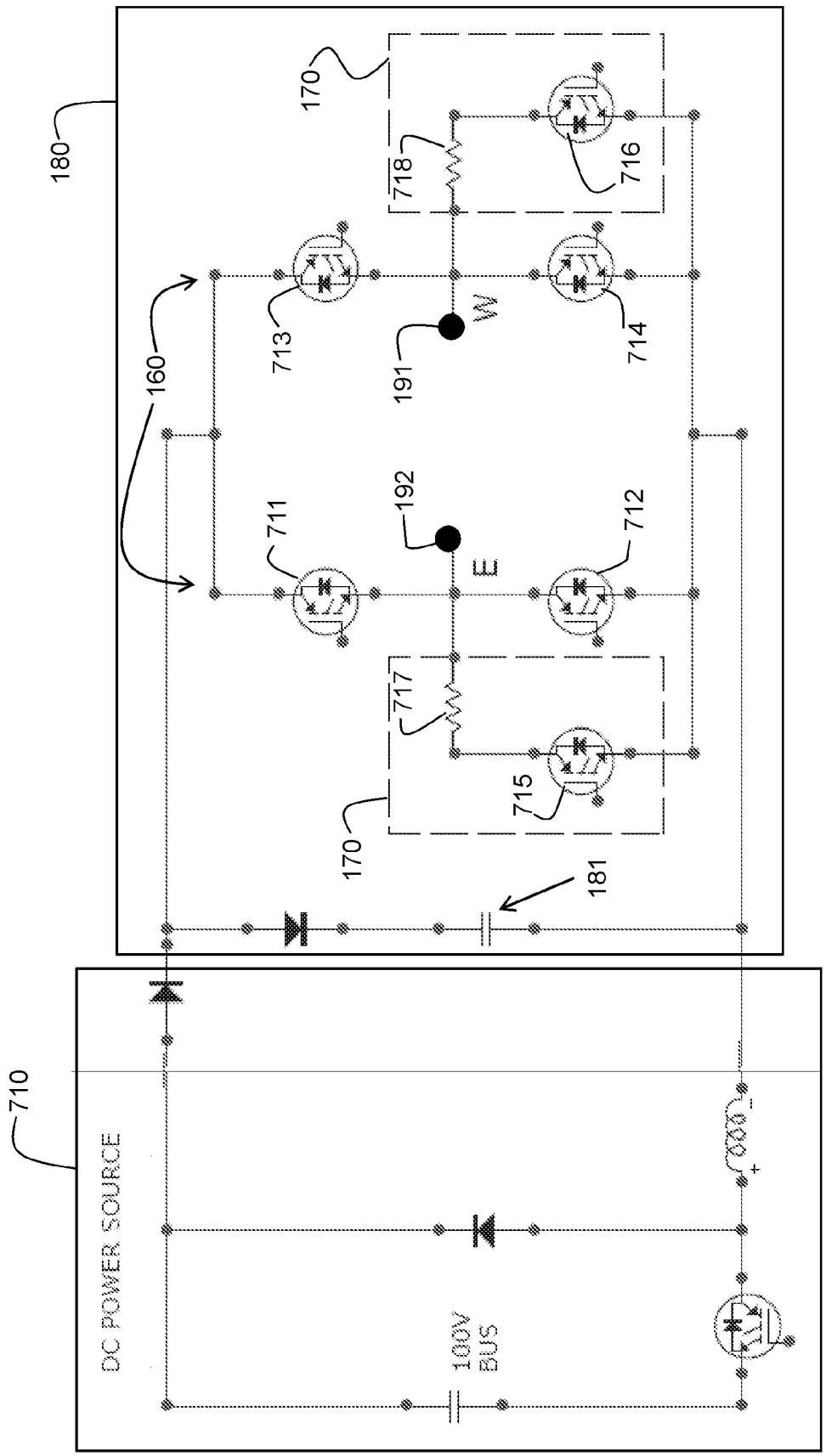
FIG. 7 illustrates a schematic diagram of a third exemplary embodiment of a portion of the welding power source of FIG. 1 having a main bridge circuit and an auxiliary bridge circuit.

FIG. 7 illustrates a schematic diagram of a third exemplary embodiment of a portion of the welding power source 100 of FIG. 1 having a hybrid bridge circuit 180 including a main bridge circuit 160 and an auxiliary bridge circuit 170. Also illustrated in FIG. 7 is a portion 710 of the power conversion circuit 110, where the power conversion circuit 100 is a chopper-based circuit. The hybrid bridge circuit 180 of FIG. 7 is in the form of a full bridge topology that may be used with almost any power source topology, providing flexibility and the potential to be added to existing designed power sources. The main bridge circuit 160 includes switching transistors 711, 712, 713, and 714. The auxiliary bridge circuit 170 is a partial auxiliary bridge circuit and includes switching transistors 715 and 716, and resistors 717 and 718. In accordance with an embodiment, the switching transistors are insulated gate bipolar transistors (IGBTs). An active snubber 181 is used to limit the voltage across the bridge circuit 180. The hybrid bridge circuit 180 of FIG. 7 provides for AC welding operation and provides high impedance paths to regulate the welding output current to a low level for spatter control and to re-establish the welding arc between the electrode E and the workpiece W at certain time intervals during the welding process, as described herein with respect to FIG. 2 and FIGS. 8A-8B. Welding output terminals 191 and 192 are shown and represent the welding output of the welding power source to which the electrode E and the workpiece W may be connected through a welding cable path.

FIGS. 8A-8B illustrate the operation of the portion of the welding power source in FIG. 7 when implementing an AC version of the welding output current waveform 200 of FIG. 2. FIG. 8A illustrates operation of the circuit of FIG. 7 during a positive portion of the welding output current waveform 200. During times of the background current section 210, the pinch current section 220, the peak current section 230, and the tail-out current section 240 (shown by the bolded portion of the waveform in the top portion of FIG. 8A), the switching transistors 711 and 714 of the main bridge circuit 160 are ON and the switching transistors 712 and 713 of the main bridge circuit 160 are OFF. As a result, the welding output current flows as indicated by the solid arrows in the top portion of FIG. 8A.

During the times of current decay (shown by the bolded portion of the waveform in the middle portion of FIG. 8A), only the switching transistor 716 of the auxiliary bridge circuit 170 is ON. As a result, the welding output current flows through the high impedance path provided by the switching transistor 716 and the resistor 718 as indicated by the solid arrows in the middle portion of FIG. 8A, providing a high potential drop between the electrode E and the workpiece W, thus allowing the welding output current to quickly decay. In accordance with an embodiment, the controller anticipates when the output current is approaching zero during current decay and turns a switch of the main bridge (e.g., switch 711) back ON. For example, the power source may use the current feedback circuit 150 to monitor the welding output current and provide the monitored current back to the controller 130. In general, during droplet transfer, the main bridge opens and the primary decay path is through the partial auxiliary bridge and anti-parallel diode of the switching transistor 712 in the opposing main bridge leg as shown in the middle portion of FIG. 8A.

During the times of the low current transition sections 215 and 225 (shown by the bolded portion of the waveform in the bottom portion of FIG. 8A), only the switching transistor 711 of the main bridge circuit 160 is ON, and only the switching transistor 716 of the auxiliary bridge circuit 170 is ON. As a result, the welding output current flows through the high impedance path provided by the switching transistor 716 and the resistor 718 as indicated by the solid arrows in the bottom portion of FIG. 8A, thus allowing the welding output current to be regulated to a determined low level. In accordance with an embodiment of the present invention, a value of the resistors 717 and 718 is less than two ohms (e.g., one ohm). In accordance with another embodiment, a value of the resistors 717 and 718 is less than one ohm (e.g., 0.5 ohms).

Again, such quick decaying and regulation of the welding output current with the hybrid bridge circuit 180 provide for low spatter conditions and reliable re-establishment of the arc between the electrode E and the workpiece W. The load shown in FIGS. 8A-8B represents the resistance and inductance of the arc between the electrode E and the workpiece W and the welding cable path connecting the electrode E and workpiece W to the welding power source. The electrode E, workpiece W, and the welding cable path are not a part of the welding power source, however.

Similarly, FIG. 8B illustrates operation of the circuit of FIG. 7 during a negative portion of the welding current waveform. During times of the background current section 210, the pinch current section 220, the peak current section 230, and the tail-out current section 240 (shown by the bolded portion of the waveform in the top portion of FIG. 8B), the switching transistors 712 and 713 of the main bridge circuit 160 are ON and the switching transistors 711 and 714 of the main bridge circuit 160 are OFF. As a result, the welding output current flows as indicated by the solid arrows in the top portion of FIG. 8B.

During the times of current decay (shown by the bolded portion of the waveform in the middle portion of FIG. 8B), only the switching transistor 715 of the auxiliary bridge circuit 170 is ON. As a result, the welding output current flows through the high impedance path provided by the switching transistor 715 and the resistor 717 as indicated by the solid arrows in the middle portion of FIG. 8B, providing a high potential drop between the electrode E and the workpiece W, thus allowing the welding output current to quickly decay. In accordance with an embodiment, the controller anticipates when the output current is approaching zero during current decay and turns a switch of the main bridge (e.g., switch 713) back ON. For example, the power source may use the current feedback circuit 150 to monitor the welding output current and provide the monitored current back to the controller 130. In general, during droplet transfer, the main bridge opens and the primary decay path is through the partial auxiliary bridge and anti-parallel diode of the switching transistor in the opposing main bridge leg as shown in the middle portion of FIG. 8B.

During the times of the low current transition sections 215 and 225 (shown by the bolded portion of the waveform in the bottom portion of FIG. 8B), only the switching transistor 713 of the main bridge circuit 160 is ON, and only the switching transistor 715 of the auxiliary bridge circuit 170 is ON. As a result, the welding output current flows through the high impedance path provided by the switching transistor 715 and the resistor 717 as indicated by the solid arrows in the bottom portion of FIG. 8B, thus allowing the welding output current to be regulated to a determined low level. Again, such quick decaying and regulation of the welding output current provides for low spatter conditions and reliable re-establishment of the arc between the electrode E and the workpiece W. In accordance with an embodiment of the present invention, the switching transistors are controlled (turned ON and OFF) by the controller 130.

In general, during transfer of a molten metal ball 250, the main bridge circuit 160 opens, leaving the auxiliary bridge circuit 170 to provide a high impedance path without interrupting current flow. Without the auxiliary bridge circuit 170, the main bridge circuit 160 would have to be completely interrupted such that the only decay path would be through the active snubber 181, allowing the welding output current to fall to zero. Such operation without the auxiliary bridge circuit 170 would not provide the reliable, controlled low spatter conditions and arc re-establishment that are desired.

Figure 9:
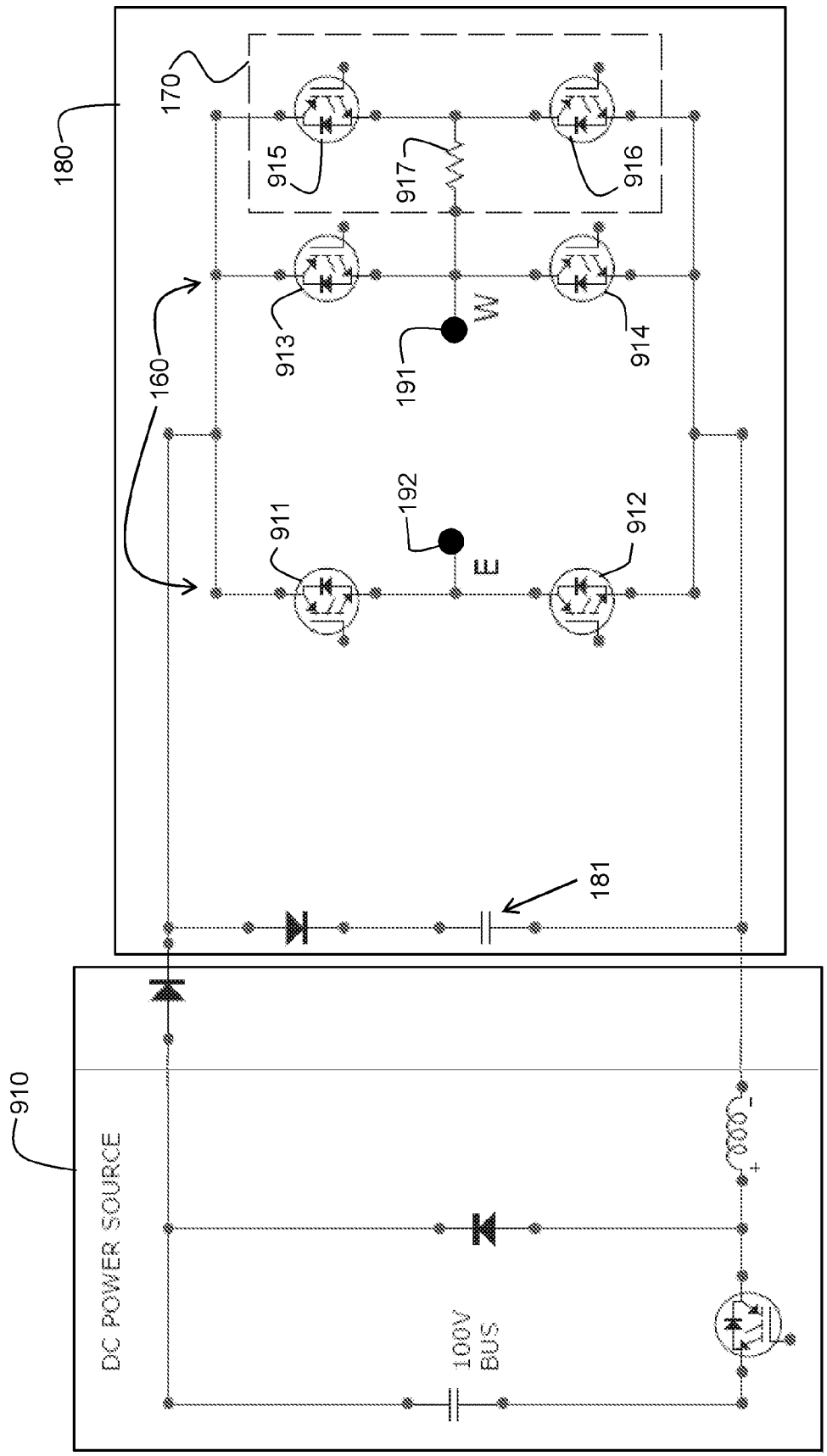
FIG. 9 illustrates a schematic diagram of a fourth exemplary embodiment of a portion of the welding power source of FIG. 1 having a main bridge circuit and an auxiliary bridge circuit.

FIG. 9 illustrates a schematic diagram of a fourth exemplary embodiment of a portion of the welding power source of FIG. 1 having a hybrid bridge circuit 180 including a main bridge circuit 160 and an auxiliary bridge circuit 170. Also illustrated in FIG. 9 is a portion 910 of the power conversion circuit 110, where the power conversion circuit 100 is a chopper-based circuit. The hybrid bridge circuit 180 of FIG. 9 is in the form of a full bridge topology that may be used with almost any power source topology, providing flexibility and the potential to be added to existing designed power sources. The main bridge circuit 160 includes switching transistors 911, 912, 913, and 914. The auxiliary bridge circuit 170 is a partial auxiliary bridge circuit and includes switching transistors 915 and 916, and resistor 917. In accordance with an embodiment, the switching transistors are insulated gate bipolar transistors (IGBTs). An active snubber 181 is used to limit the voltage across the bridge circuit 180. The hybrid bridge circuit 180 of FIG. 9 provides for AC welding operation and provides a high impedance path to regulate the welding output current to a low level for spatter control and to re-establish the welding arc between the electrode E and the workpiece W at certain time intervals during the welding process, as described herein with respect to FIG. 2 and FIGS. 10A-10B. Welding output terminals 191 and 192 are shown and represent the welding output of the welding power source to which the electrode E and the workpiece W may be connected through a welding cable path.

Figure 10A:
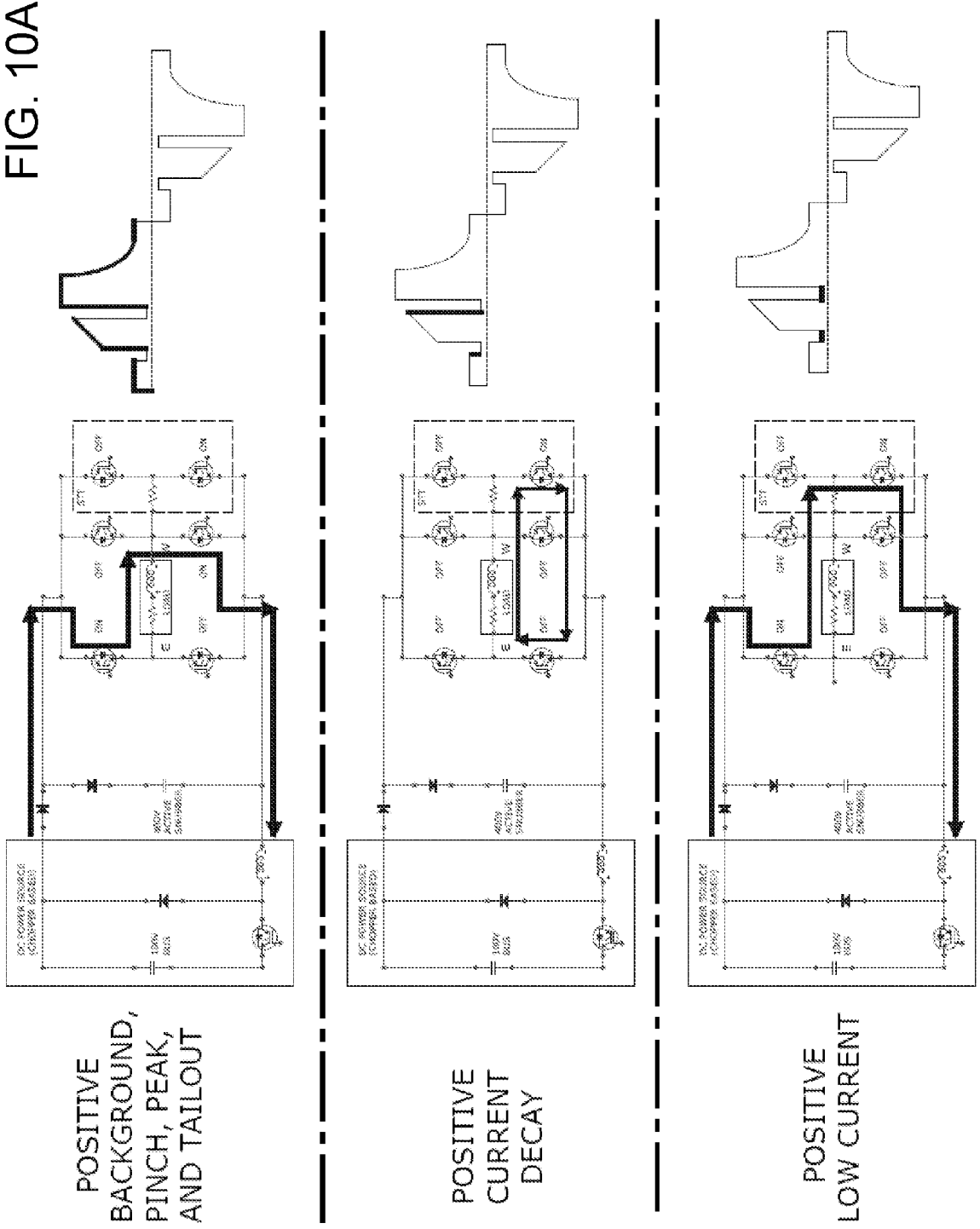

FIGS. 10A-10B illustrate the operation of the portion of the welding power source in FIG. 9 when implementing an AC version of the welding output current waveform 200 of FIG. 2. FIG. 9A illustrates operation of the circuit of FIG. 9 during a positive portion of the welding output current waveform 200. During times of the background current section 210, the pinch current section 220, the peak current section 230, and the tail-out current section 240 (shown by the bolded portion of the waveform in the top portion of FIG. 10A), the switching transistors 911 and 914 of the main bridge circuit 160 are ON and the switching transistors 912 and 913 of the main bridge circuit 160 are OFF. As a result, the welding output current flows as indicated by the solid arrows in the top portion of FIG. 10A.

During the times of current decay (shown by the bolded portion of the waveform in the middle portion of FIG. 10A), only the switching transistor 916 of the auxiliary bridge circuit 170 is ON. As a result, the welding output current flows through the high impedance path provided by the switching transistor 916 and the resistor 917 as indicated by the solid arrows in the middle portion of FIG. 10A, providing a high potential drop between the electrode E and the workpiece W, thus allowing the welding output current to quickly decay. In accordance with an embodiment, the controller anticipates when the output current is approaching zero during current decay and turns a switch of the main bridge (e.g., switch 911) back ON. For example, the power source may use the current feedback circuit 150 to monitor the welding output current and provide the monitored current back to the controller 130. In general, during droplet transfer, the main bridge opens and the primary decay path is through the partial auxiliary bridge and anti-parallel diode of the switching transistor in the opposing main bridge leg as shown in the middle portion of FIG. 10A.

During the times of the low current transition sections 215 and 225 (shown by the bolded portion of the waveform in the bottom portion of FIG. 10A), only the switching transistor 911 of the main bridge circuit 160 is ON, and only the switching transistor 916 of the auxiliary bridge circuit 170 is ON. As a result, the welding output current flows through the high impedance path provided by the switching transistor 916 and the resistor 917 as indicated by the solid arrows in the bottom portion of FIG. 10A, thus allowing the welding output current to be regulated to a determined low level. In accordance with an embodiment of the present invention, a value of the resistor 917 is less than two ohms (e.g., one ohm). In accordance with another embodiment, a value of the resistor 917 is less than one ohm (e.g., 0.5 ohms).

Again, such quick decaying and regulation of the welding output current with the hybrid bridge circuit 180 provide for low spatter conditions and reliable re-establishment of the arc between the electrode E and the workpiece W. The load shown in FIGS. 10A-10B represents the resistance and inductance of the arc between the electrode E and the workpiece W and the welding cable path connecting the electrode E and workpiece W to the welding power source. The electrode E, workpiece W, and the welding cable path are not a part of the welding power source, however.

Similarly, FIG. 10B illustrates operation of the circuit of FIG. 9 during a negative portion of the welding current waveform. During times of the background current section 210, the pinch current section 220, the peak current section 230, and the tail-out current section 240 (shown by the bolded portion of the waveform in the top portion of FIG. 10B), the switching transistors 912 and 913 of the main bridge circuit 160 are ON and the switching transistors 911 and 914 of the main bridge circuit 160 are OFF. As a result, the welding output current flows as indicated by the solid arrows in the top portion of FIG. 10B.

During the times of current decay (shown by the bolded portion of the waveform in the middle portion of FIG. 10B), only the switching transistor 915 of the auxiliary bridge circuit 170 is ON. As a result, the welding output current flows through the high impedance path provided by the switching transistor 915 and the resistor 917 as indicated by the solid arrows in the middle portion of FIG. 10B, providing a high potential drop between the electrode E and the workpiece W, thus allowing the welding output current to quickly decay. In accordance with an embodiment, the controller anticipates when the output current is approaching zero during current decay and turns a switch of the main bridge (e.g., switch 912) back ON. For example, the power source may use the current feedback circuit 150 to monitor the welding output current and provide the monitored current back to the controller 130. In general, during droplet transfer, the main bridge opens and the primary decay path is through the partial auxiliary bridge and anti-parallel diode of the switching transistor in the opposing main bridge leg as shown in the middle portion of FIG. 10B.

During the times of the low current transition sections 215 and 225 (shown by the bolded portion of the waveform in the bottom portion of FIG. 10B), only the switching transistor 912 of the main bridge circuit 160 is ON, and only the switching transistor 915 of the auxiliary bridge circuit 170 is ON. As a result, the welding output current flows through the high impedance path provided by the switching transistor 915 and the resistor 917 as indicated by the solid arrows in the bottom portion of FIG. 10B, thus allowing the welding output current to be regulated to a determined low level. Again, such quick decaying and regulation of the welding output current provides for low spatter conditions and reliable re-establishment of the arc between the electrode E and the workpiece W. In accordance with an embodiment of the present invention, the switching transistors are controlled (turned ON and OFF) by the controller 130.

In general, during transfer of a molten metal ball 250, the main bridge circuit 160 opens, leaving the auxiliary bridge circuit 170 to provide a high impedance path without interrupting current flow. Without the auxiliary bridge circuit 170, the main bridge circuit 160 would have to be completely interrupted such that the only decay path would be through the active snubber 181, allowing the welding output current to fall to zero. Such operation without the auxiliary bridge circuit 170 would not provide the reliable, controlled low spatter conditions and arc re-establishment that are desired.

In summary, systems and methods for providing controlled AC arc welding processes are disclosed. In arc welding power source embodiments, configurations of main and auxiliary bridge circuits allow for the directional switching of the output welding current through the welding output circuit path and selectively provide one or more high impedance paths to rapidly decay the arc current. The high impedance path aids in the low spatter transfer of molten metal balls from a consumable electrode to a workpiece and further aids in the maintaining or the re-establishing of an arc between the consumable electrode and the workpiece when a molten metal ball is transferred.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A welding power source comprising:
   a power conversion circuit configured to convert an input current to an output current;
   a polarity switching low impedance bridge operatively connected to the power conversion circuit having two or more low impedance switches configured to switch a direction of the output current through a welding output circuit path operatively connected to a welding output of the welding power source at the command of a controller based on positive polarity or negative polarity of the output current; and
   an alternate high impedance auxiliary bridge connected in parallel to the polarity switching low impedance bridge having two or more alternate switches configured to route the output current through one or more high impedance paths between the power conversion circuit and the welding output circuit path based on the positive polarity or the negative polarity of the output current at the command of the controller.

2. The welding power source of claim 1, wherein the power conversion circuit, the polarity switching low impedance bridge, and the alternate high impedance auxiliary bridge are configured to provide any of a DC positive welding operation, a DC negative welding operation, and an AC welding operation at the command of the controller of the welding power source.

3. The welding power source of claim 1, wherein the power conversion circuit is transformer based with a half bridge output topology.

4. The welding power source of claim 1, wherein the power conversion circuit includes a DC output topology.

5. The welding power source of claim 1, wherein the power conversion circuit is an inverter-based circuit.

6. The welding power source of claim 1, wherein the power conversion circuit is a chopper-based circuit.

7. The welding power source of claim 1, wherein the polarity switching low impedance bridge is configured as one of a half bridge circuit or a full bridge circuit.

8. The welding power source of claim 1, wherein the polarity switching low impedance bridge includes at least two switching transistors.

9. The welding power source of claim 1, wherein the alternate high impedance auxiliary bridge includes at least two switching transistors and at least one resistor.

10. The welding power source of claim 9, wherein a resistance value of the at least one resistor is less than 2 ohms.

11. The welding power source of claim 9, wherein a resistance value of the at least one resistor is less than 1 ohm.

12. A welding power source comprising:
    means for converting an input current to an output current;
    means for switching a direction of the output current through a welding output circuit path operatively connected to a welding output of the welding power source to provide at least a welding operation, the switching based on a polarity of the output current;
    means for rapidly reducing a level of the output current to a regulated non-zero level to provide a low spatter wet-in of a molten metal ball at an end of a consumable welding electrode into a weld puddle on a workpiece; and
    means for rapidly reducing a level of the output current to a regulated non-zero level to provide the automatic re-establishment of an arc between the end of the consumable welding electrode and the workpiece immediately after the molten metal ball has transferred to the workpiece.

13. A method comprising:
    converting an input current to an output current in a welding power source;
    switching a direction of the output current through a welding output circuit path operatively connected to a welding output of the welding power source from a first direction to a second direction at the command of a controller, the switching through the welding output circuit path based at least in part on a polarity of the output current; and
    further selectively switching the output current through a high impedance path at the command of the controller to reduce a level of the output current to a regulated non-zero level while maintaining the second direction of the output current through the welding output circuit path, the switching through the high impedance path based at least in part on a polarity of the output current.

14. The method of claim 13, further comprising:
    switching a direction of the output current through the welding output circuit path from the second direction to the first direction at the command of the controller of the welding power source; and
    further selectively switching the output current through a high impedance path within the welding power source at the command of the controller of the welding power source to reduce a level of the output current to a regulated non-zero level while maintaining the first direction of the output current through the welding output circuit path.

15. The method of claim 13, wherein the high impedance path includes at least one switching transistor and at least one resistor.

16. The method of claim 14, wherein the high impedance path includes at least one switching transistor and at least one resistor.

17. The welding power source of claim 1, wherein the alternate high impedance auxiliary bridge includes a shared resistor between the two or more alternate switches in a common current path.

* * * * *